US008684272B2

(12) United States Patent
Wong et al.

(10) Patent No.: US 8,684,272 B2
(45) Date of Patent: Apr. 1, 2014

(54) MOBILE COMMUNICATION DEVICE AND ANTENNA STRUCTURE THEREOF

(75) Inventors: Kin-Lu Wong, New Taipei (TW); Fang-Hsien Chu, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 439 days.

(21) Appl. No.: 13/091,096

(22) Filed: Apr. 20, 2011

(65) Prior Publication Data

US 2012/0218163 A1 Aug. 30, 2012

(30) Foreign Application Priority Data

Feb. 25, 2011 (TW) ............................ 100106391 A

(51) Int. Cl.
*G06K 19/06* (2006.01)

(52) U.S. Cl.
USPC ........................................................ 235/492

(58) Field of Classification Search
USPC ........................................................ 235/492
See application file for complete search history.

(56) References Cited

U.S. PATENT DOCUMENTS

| | | | |
|---|---|---|---|
| 7,768,466 | B2 | 8/2010 | Chi |
| 2007/0008228 | A1 | 1/2007 | Yamada |

FOREIGN PATENT DOCUMENTS

| | | | |
|---|---|---|---|
| CN | 1897354 | A | 1/2007 |
| EP | 1 439 604 | A1 | 7/2004 |
| JP | H0738325 | A | 2/1995 |
| JP | 20055780 | A | 1/2005 |
| JP | 2006319629 | A | 11/2006 |
| JP | 2006319767 | A | 11/2006 |
| JP | 200728023 | A | 2/2007 |
| JP | 2008205991 | A | 9/2008 |
| JP | 2009135822 | A | 6/2009 |
| JP | 2009171567 | A | 7/2009 |
| JP | 201110017 | A | 1/2011 |
| KR | 1020050122093 | A | 12/2005 |
| KR | 1020090104333 | A | 10/2009 |

*Primary Examiner* — Kristy A Haupt
(74) *Attorney, Agent, or Firm* — Winston Hsu; Scott Margo

(57) ABSTRACT

A mobile communication device having an antenna structure includes a grounding element and an antenna element. The grounding element includes a main ground and a protruded ground being connected to an edge of the main ground. Antenna element includes a feeding portion and a radiating portion. The feeding portion includes a feeding point, a first strip and a second strip. The first strip and the second strip are both connected to the feeding point. The radiating portion includes a first open end, a second open end and a shorting point which is connected to the protruded ground by a short-circuiting strip. There is a first coupling gap between the first strip and a first section of the radiating portion having the first open end. There is a second coupling gap between the second strip and a second section of the radiating portion having the second open end.

17 Claims, 4 Drawing Sheets

MOBILE COMMUNICATION DEVICE AND ANTENNA STRUCTURE THEREOF

BACKGROUND OF THE INVENTION

1. Field of the Invention

The present invention relates to a mobile communication device and an antenna structure thereof, and more particularly, to a mobile communication device and an antenna structure with a built-in multiband antenna capable of being integrated with a ground plane configured with an external data transmission element.

2. Description of the Prior Art

With the progress of wireless technology, the wireless communication industry has benefited. Mobile communication devices are required to be light and small, such that small size, multi-band operations, as well as the integration of an internal antenna and other electronic elements on the system circuit board of the device become essential design considerations. However, in order to obtain wideband operation and perform the integration of an internal antenna and other electronic elements on the system circuit board of the device, conventional antennas in the mobile communication devices directly dispose its antenna in the no-ground section of the system circuit board of the device, such that coupling effects between the antenna and the grounding plane can be reduced and sufficient operating bandwidth can be provided to cover the wideband WWAN operation. However, such WWAN antenna is mostly disposed on a single no-ground section of the system circuit board, which may reduce the design freedom of the internal electronic elements of the mobile communication device.

In the prior art, such as U.S. Pat. No. 7,768,466 B2 with the invention entitled "Multiband folded loop antenna", a mobile antenna occupying the three-dimensional space is disclosed, whose antenna is disposed on a single no-ground section to achieve wideband operation. However, by adopting such antenna configuration, the integration of the antenna and other electronic elements functioning as a data transmission port (such as, a USB connector) of the mobile communication device cannot be achieved, which results in an inefficient configuration of the internal space of the mobile communication device. In addition, its operating band cannot cover the eight-band LTE/WWAN operation, including LTE700/GSM850/900/1800/1900/UMTS/LTE2300/2500, which cannot satisfy requirements of covering operating bands of all mobile communication systems at present.

Hence, how to provide a mobile communication device with two wide operating bands at least covering from about 704 MHz to 960 MHz and from about 1710 MHz to 2690 MHz to satisfy the eight-band LTE/WWAN operation and perform the integration of an internal antenna and other electronic elements on the system circuit board of the device has become an important topic in this field.

SUMMARY OF THE INVENTION

It is one of the objectives of the present invention to provide a mobile communication device and a related antenna structure to solve the abovementioned problems that the integration of its built-in antenna with electronic elements functioning as a data transmission port, such that a goal of covering multi-band operation can be achieved.

According to an aspect of the present invention, a mobile communication device comprising an antenna structure is provided. The antenna structure may include a grounding element and an antenna element. The grounding element may include a main ground and a protruded ground, wherein the protruded ground is electrically connected to an edge of the main ground. The antenna element is disposed on the substrate. The antenna element may include a feeding portion and a radiating portion. The feeding portion may include a feeding point, a first strip and a second strip. The feeding point is electrically connected to a signal source being disposed on the grounding element. The first strip and the second strip are both connected to the feeding point, and open ends of the first strip and the second strip are extended toward opposite directions. In addition, a projection which is generated by projecting the feeding portion onto a plane where the grounding element is located, and the projection comprises a partial section of the protruded ground. The radiating portion may include a shorting point, a first open end and a second open end. The shorting point is electrically connected to the protruded ground by a short-circuiting strip. There is a first coupling gap between the first strip and a first section of the radiating portion having the first open end, and there is a second coupling gap between the second strip and a second section of the radiating portion having the second open end.

According to another aspect of the present invention, an antenna structure is provided. The antenna structure may include a grounding element and an antenna element. The grounding element may include a main ground and a protruded ground, wherein the protruded ground is electrically connected to an edge of the main ground. The antenna element is disposed on the substrate. The antenna element may include a feeding portion and a radiating portion. The feeding portion may include a feeding point, a first strip and a second strip. The feeding point is electrically connected to a signal source being disposed on the grounding element. The first strip and the second strip are both connected to the feeding point, and open ends of the first strip and the second strip are extended toward opposite directions. The radiating portion may include a shorting point, a first open end and a second open end. The shorting point is electrically connected to the protruded ground by a short-circuiting strip. There is a first coupling gap between the first strip and a first section of the radiating portion having the first open end, and there is a second coupling gap between the second strip and a second section of the radiating portion having the second open end.

The present invention includes the following advantages. By using the first coupling gap between the first section of the radiating portion having the first open end and the first strip of the feeding portion, a quarter-wavelength resonant mode can be excited at the lower frequency (such as, 750 MHz nearby) and a higher-order resonant mode can be excited at the higher frequencies (such as, 2700 MHz nearby). In addition, by using the second coupling gap between the second section of the radiating portion having the second open end and the second strip of the feeding portion, a quarter-wavelength resonant mode can be excited at the lower frequencies (such as, 1000 MHz nearby), and then these two lower-frequency resonant modes can be combined to form a wide first (lower-frequency) operating band at least covering from about 704 MHz to 960 MHz. Moreover, since a length of the first strip of the feeding portion is different from a length of the second strip of the feeding portion, each of them is able to form a quarter-wavelength resonant mode at the higher frequencies (such as, 1950 MHz and 2300 MHz nearby), respectively. Then, these two higher-frequency resonant modes can be combined with the higher-order resonant mode (such as, 2700 MHz nearby) excited by the first coupling gap in order to form a wide second (higher-frequency) operating band at least covering from about 1710 MHz to 2690 MHz.

These and other objectives of the present invention will no doubt become obvious to those of ordinary skill in the art after reading the following detailed description of the preferred embodiment that is illustrated in the various figures and drawings.

DETAILED DESCRIPTION

The following description is of the best-contemplated mode of carrying out the present invention. A detailed description is given in the following embodiments with reference to the accompanying drawings.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
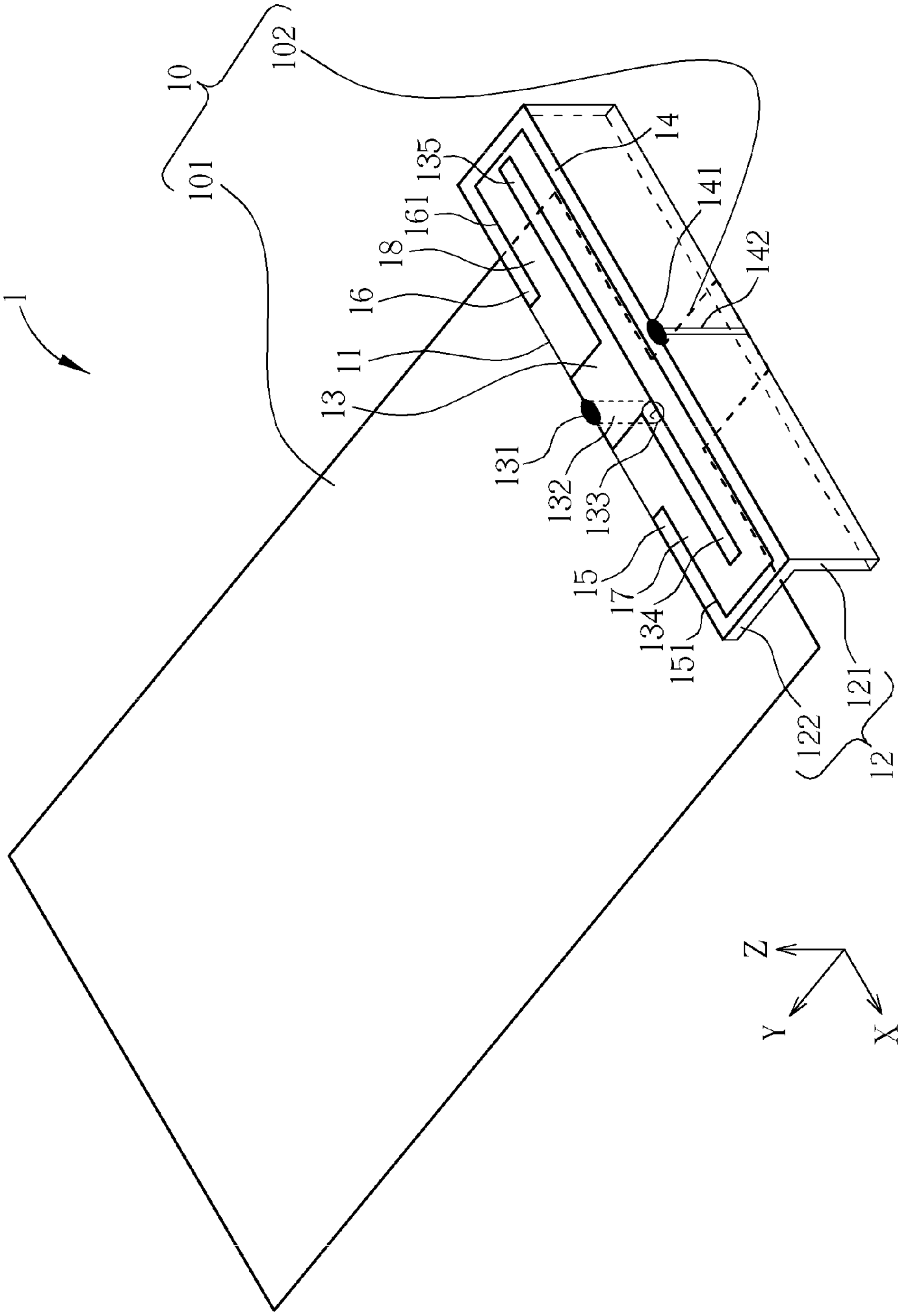
FIG. 1 is a diagram illustrating a mobile communication device and an antenna structure disposed therein according to a first embodiment of the present invention.

FIG. 1 is a diagram illustrating a mobile communication device and an antenna structure disposed therein according to a first embodiment of the present invention. In this embodiment, the mobile communication device 1 may include an antenna structure, wherein the antenna structure may include a grounding element 10 and an antenna element 11. The ground element 10 may include a main ground 101 and a protruded ground 102, wherein the protruded ground 102 is electrically connected to an edge of the main ground 101.

Furthermore, the antenna element 11 is disposed on a substrate 12. The antenna element 11 may include a feeding portion 13 and a radiating portion 14. The feeding portion 13 may include a feeding point 131, a first strip 134 and a second strip 135. The feeding point 131 is electrically connected to a signal source 133 being disposed on the grounding element 10 through a metal wire 132. The first strip 134 and the second strip 135 are both connected to the feeding point 131, and open ends of the first strip 134 and the second strip 135 are extended toward opposite directions. What calls for special attention is that: a length of the first strip 134 from its open end to the feeding point 131 is larger than 0.2 wavelength of the highest operating frequency of the second operating band; and/or a length of the second strip 135 from its open end to the feeding point 131 is larger than 0.2 wavelength of the highest operating frequency of the second operating band. In addition, a projection is generated by projecting the feeding portion 13 onto a plane where the grounding element 10 is located, and the projection comprises a partial section of the protruded ground 102. The radiating portion 14 may include a shorting point 141, a first open end 15 and a second open end 16. The shorting point 141 is electrically connected to the protruded ground 102 by a short-circuiting strip 142. Be noted that: there is a first coupling gap 17 between a first section 151 of the radiating portion 14 having the first open end 15 and the first strip 134, and there is a second coupling gap 18 between a second section 161 of the radiating portion 14 having the second open end 16 and the second strip 135. Herein the first coupling gap 17 is smaller than 2 mm, and the second coupling gap 18 is smaller than 2 mm.

Figure 2:
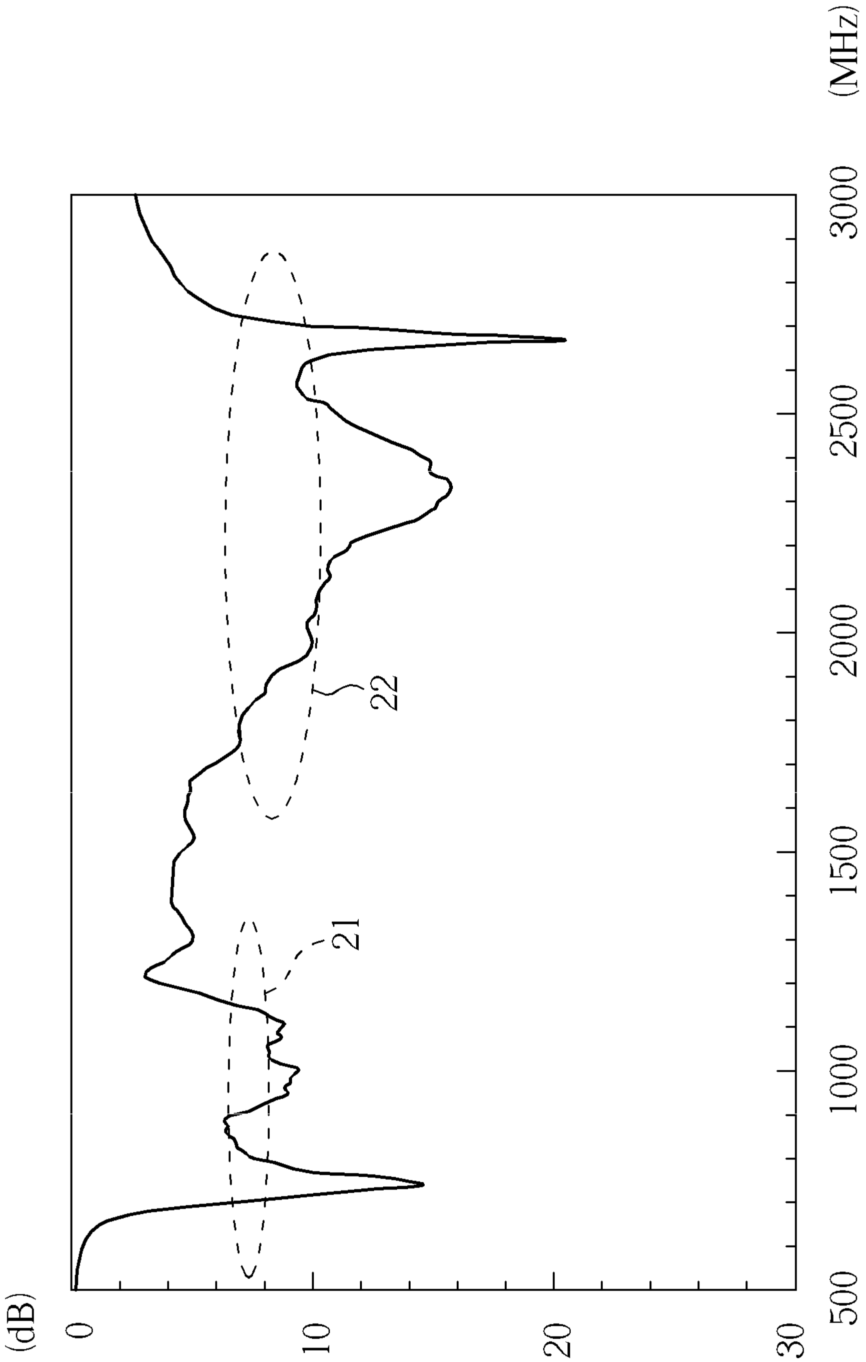
FIG. 2 is a diagram illustrating the measured return loss of the mobile communication device and the antenna structure disposed therein according to a first embodiment of the present invention.

Please refer to FIG. 1 together with FIG. 2. FIG. 2 is a diagram illustrating the measured return loss of the mobile communication device and the antenna structure disposed therein according to a first embodiment of the present invention. In this embodiment, by using the first strip 134 of the feeding portion 13, the metal path from the first open end 15 which is short-circuited to the protruded ground 102 through the short-circuiting strip 142 is excited by the first coupling gap 17, such that a quarter-wavelength resonant mode can be excited at the lower frequency (such as, 750 MHz nearby) and a higher-order resonant mode can be excited at the higher frequencies (such as, 2700 MHz nearby). In addition, by using the second strip 135 of the feeding portion 13, the metal path from the second open end 16 which is short-circuited to the protruded ground 102 through the short-circuiting strip 142 is excited by the second coupling gap 18, such that a quarter-wavelength resonant mode can be excited at the lower frequencies (such as, 1000 MHz nearby). Then, these two lower-frequency resonant modes can be combined to form a wide first (lower-frequency) operating band (such as, the first operating band 21 shown in FIG. 2) at least covering from about 704 MHz to 960 MHz. Moreover, since a length of the first strip 134 of the feeding portion 13 is different from a length of the second strip 135 of the feeding portion 13, each of them is able to form a quarter-wavelength resonant mode at the higher frequencies (such as, 1950 MHz and 2300 MHz nearby), respectively. Then, these two higher-frequency resonant modes can be combined with the higher-order resonant mode (such as, 2700 MHz nearby) excited by the first coupling gap 17 by exciting the metal path from the first open end 15 which is short-circuited to the protruded ground 102 through the short-circuiting strip 142 in order to form a wide second (higher-frequency) operating band (such as, the first operating band 22 shown in FIG. 2) at least covering from about 1710 MHz to 2690 MHz. What calls for special attention is that: the first operating band 21 may cover the three-band LTE700/GSM850/900 operation, and the second operating band 22 may cover the five-band GSM1800/1900/UMTS/LTE2300/2500 operation, thereby the antenna structure can cover the eight-band LTE/WWAN operation. Therefore, the antenna structure of the mobile communication device can cover operating bands of all mobile communication systems at present. The antenna structure of the present invention also has a simple structure and is easy to manufacture, which can satisfy practical applications.

Please note that: in this embodiment, the grounding element 10 of the antenna structure and the substrate 12 are located on different planes of the three-dimensional space. For example, the main ground 101 and the protruded ground 102 of the grounding element 10 are located on a first plane (such as, the XY plane shown in FIG. 1); the substrate 12 comprises a first partial section 121 and a second partial section 122 forming an L shape, the first partial section 121 of the substrate 12 having the short-circuiting strip 142 is located on a second plane (such as, the XZ plane shown in FIG. 1) perpendicular to the first plane, and the second partial section 122 of the substrate 12 having the antenna element 11 is located on a third plane (such as, another XY plane shown in FIG. 1) parallel to the first plane.

FIG. 2 is a diagram illustrating the measured return loss of the mobile communication device and the antenna structure disposed therein according to a first embodiment of the present invention. In this embodiment, the size of the mobile communication device 1 is as follows: the main ground 101 has a length of 105 mm and a width of 55 mm; the protruded ground 102 has a length of 10 mm and a width of 10 mm; the second partial section 122 of the substrate 12 which is parallel to the protruded ground 102 has a length of 55 mm, a width of 10 mm, and a thickness of 0.8 mm; the first partial section 121 of the substrate 12 which is perpendicular to the protruded ground 102 has a length of 55 mm, a width of 8 mm, and a thickness of 0.8 mm. According to the experimental results and a 6-dB return-loss definition, the first operating band 21 may cover the three-band LTE700/GSM850/900 operation (from about 704 MHz to 960 MHz), and the second operating band 22 may cover the five-band GSM1800/1900/UMTS/LTE2300/2500 operation (from about 1710 MHz to 2690 MHz), thereby the antenna structure can satisfy requirements of the eight-band LTE/WWAN operation. What calls for special attention is that: the size of the protruded ground 102 is capable of configuring with a USB connector, such that the integration of the antenna and other electronic elements functioning as a data transmission port of the mobile communication device can be achieved.

Figure 3:
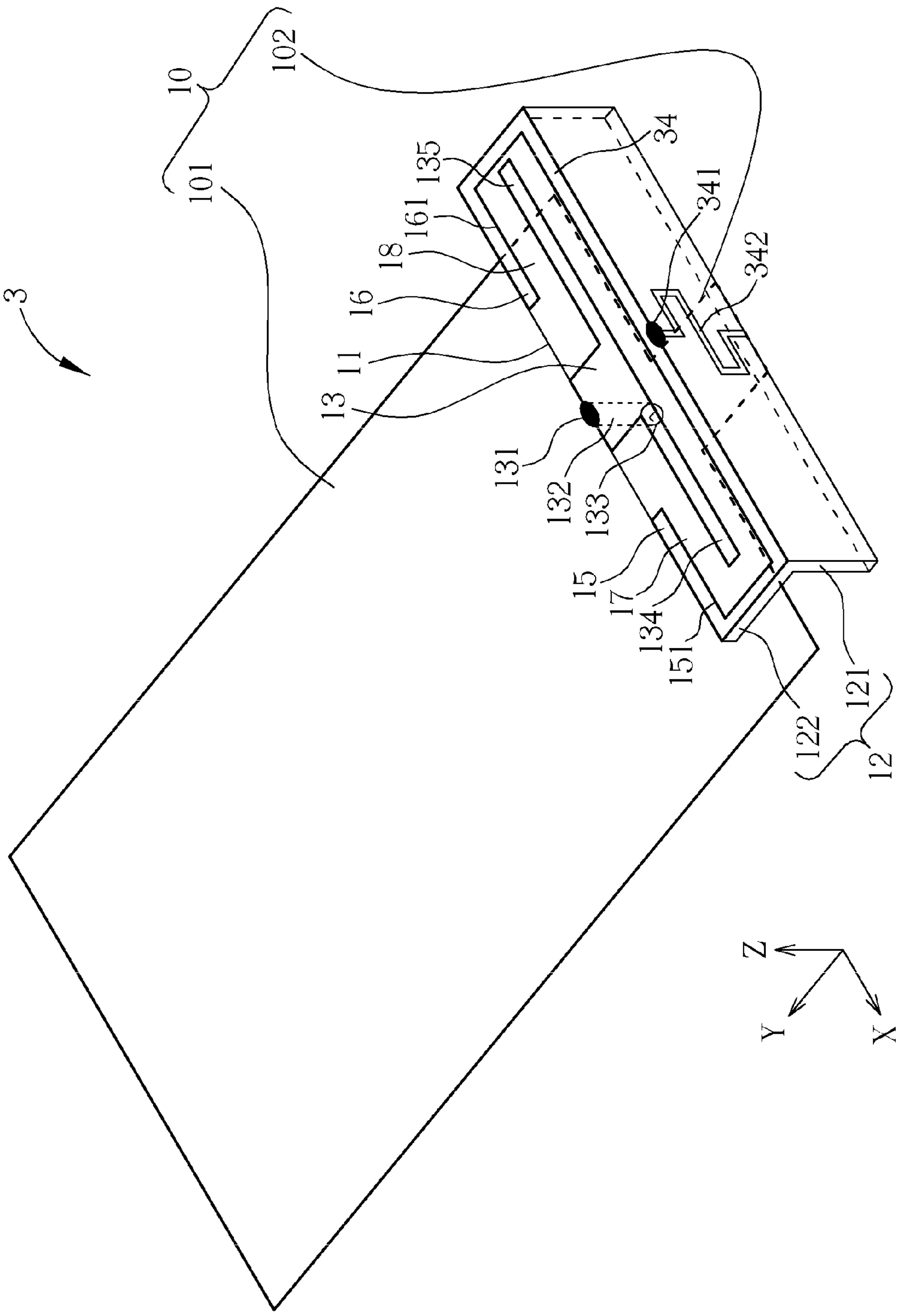
FIG. 3 is a diagram illustrating a mobile communication device and an antenna structure disposed therein according to a second embodiment of the present invention.

Please refer to FIG. 3. FIG. 3 is a diagram illustrating a mobile communication device 3 and an antenna structure disposed therein according to a second embodiment of the present invention. The structure of the mobile communication device 3 shown in the second embodiment is similar to that of the mobile communication device 1 shown in the first embodiment, and the difference between them is that: a radiating portion 34 of the antenna structure of the mobile communication device 3 shown in FIG. 3 has a shorting point 341, and the shorting point 341 is electrically connected to the protruded ground 102 through a short-circuiting strip 342, wherein the short-circuiting strip 342 includes at least two bends, and a length of the short-circuiting strip 342 is at least 1.5 times that of a distance between the shorting point 341 and the protruded ground 102. By bending the short-circuiting strip 342, the length of the short-circuiting strip 342 can be extended in order to adjust the resonant modes of the antenna element 11 and reduce the overall size of the antenna. Moreover, the structure of the mobile communication device 3 of the second embodiment is similar to that of the mobile communication device 1 of the first embodiment, and forms two similar wide operating bands covering the eight-band LTE/WWAN operation.

Figure 4:
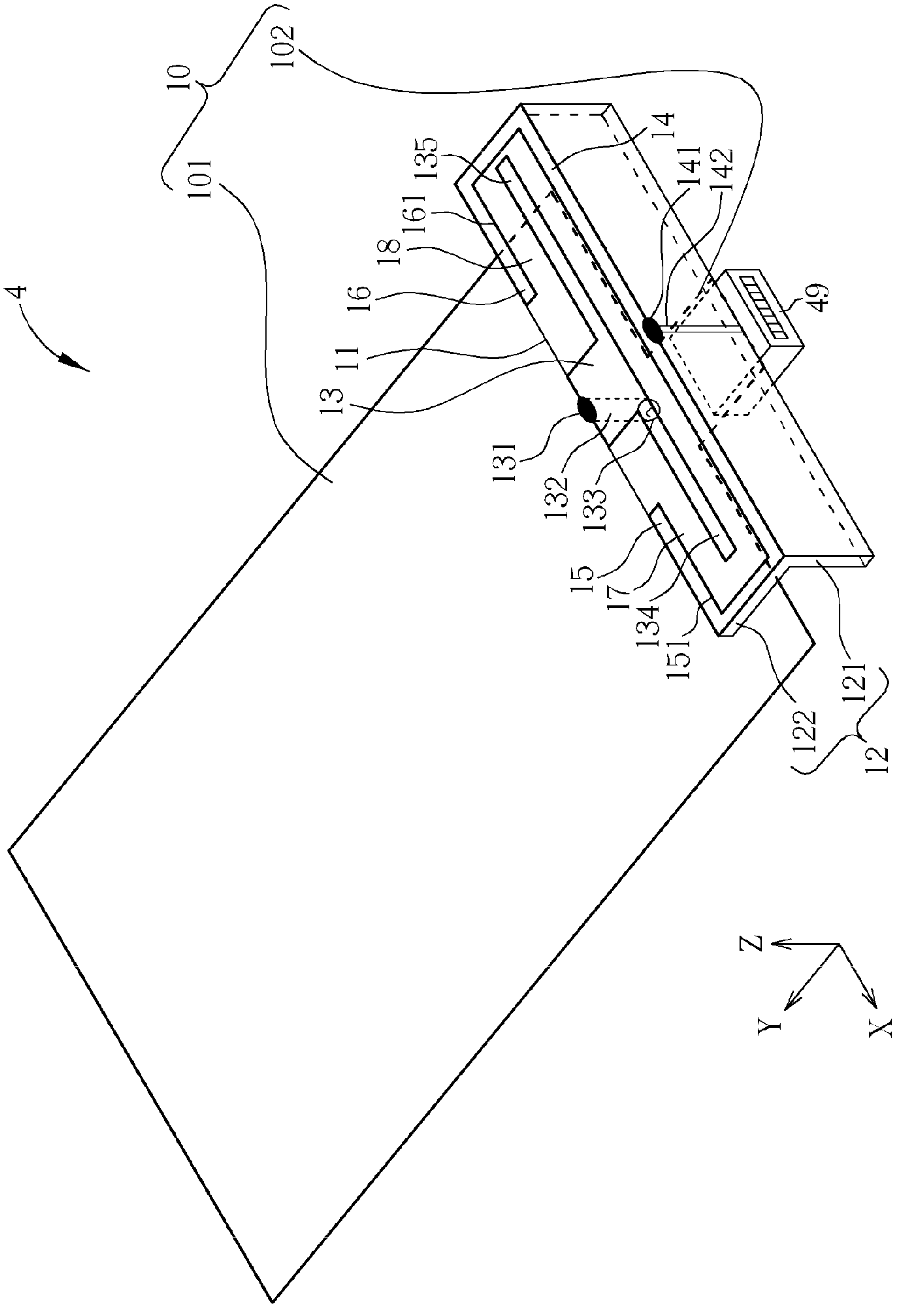
FIG. 4 is a diagram illustrating a mobile communication device and an antenna structure disposed therein according to a third embodiment of the present invention.

Please refer to FIG. 4. FIG. 4 is a diagram illustrating a mobile communication device and an antenna structure disposed therein according to a third embodiment of the present invention. The structure of the mobile communication device 4 shown in the third embodiment is similar to that of the mobile communication device 1 shown in the first embodiment, and the difference between them is that: an electronic element 49 functioning as a data transmission port can be disposed on the second surface of the protruded ground 102 of the mobile communication device 4 shown in FIG. 4, which is opposite to the first surface of the protruded ground 102 used for accommodating the antenna element 11, such that the electronic element 49 can provide a signal transmission interface for communicating the mobile communication device 4 with an external equipment. The above-mentioned electronic element 49 can be implemented by a USB connector, but this in no way should be considered as a limitation of the present invention. Moreover, the architecture of the mobile communication device 43 of the third embodiment is similar to that of the mobile communication device 1 of the first embodiment, and forms two similar wide operating bands covering the eight-band LTE/WWAN operation.

Undoubtedly, those skilled in the art should appreciate that various modifications of the mobile communication devices and the antenna structures shown in FIG. 1, FIG. 3, and FIG. 4 may be made without departing from the spirit of the present invention. In addition, the number of the bends of the radiating portion and/or the short-circuiting strip is not limited, and the bending direction, the bending angle, and the bending shape of the bends should not be considered as a limitation of the present invention.

The abovementioned embodiments are presented merely to illustrate practicable designs of the present invention, and in no way should be considered to be limitations of the scope of the present invention. In summary, a mobile communication device and its antenna structure are provided, which include an antenna capable of forming two wide operating bands. Such antenna has a simple structure as well as a protruded ground suitable for integrating with electronic elements functioning as a data transmission port. Besides, the two operating bands of the antenna may cover the three-band LTE700/GSM850/900 operation (from about 704 MHz to 960 MHz) and the five-band GSM1800/1900/UMTS/LTE2300/2500 operation (from about 1710 MHz to 2690 MHz), respectively, thereby covering operating bands of all mobile communication systems at present.

While the present invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

Those skilled in the art will readily observe that numerous modifications and alterations of the device and method may be made while retaining the teachings of the invention.

What is claimed is:

1. A mobile communication device comprising an antenna structure, the antenna structure comprising:

- a grounding element, comprising a main ground and a protruded ground, wherein the protruded ground is electrically connected to an edge of the main ground; and
- an antenna element, disposed on a substrate, the antenna element comprising:
  - a feeding portion, comprising:
    - a feeding point, electrically connected to a signal source being disposed on the grounding element; and
    - a first strip and a second strip, wherein the first strip and the second strip are both connected to the feeding point, open ends of the first strip and the second strip are extended toward opposite directions, a projection is generated by projecting the feeding portion onto a plane where the grounding element is located, and the projection comprises a partial section of the protruded ground; and a radiating portion, comprising:

a shorting point, electrically connected to the protruded ground by a short-circuiting strip; and a first open end and a second open end;

wherein there is a first coupling gap between the first strip and a first section of the radiating portion having the first open end, and there is a second coupling gap between the second strip and a second section of the radiating portion having the second open end.

2. The mobile communication device according to claim 1, wherein protruded ground is used for accommodating an electronic element functioning as a data transmission port of the mobile communication device.

3. The mobile communication device according to claim 1, wherein the short-circuiting strip comprises at least two bends, and a length of the short-circuiting strip is at least 1.5 times that of a distance between the shorting point and the protruded ground.

4. The mobile communication device according to claim 1, wherein the antenna element comprises a first operating band and a second operating band, the first operating band covers from about 704 MHz to 960 MHz, and the second operating band covers from about 1710 MHz to 2690 MHz.

5. The mobile communication device according to claim 4, wherein a length of the first strip from its open end to the feeding point is larger than 0.2 wavelength of the highest operating frequency of the second operating band.

6. The mobile communication device according to claim 4, wherein a length of the second strip from its open end to the feeding point is larger than 0.2 wavelength of the highest operating frequency of the second operating band.

7. The mobile communication device according to claim 1, wherein a length of the first strip is different from a length of the second strip.

8. The mobile communication device according to claim 1, wherein the first coupling gap is smaller than 2 mm, and the second coupling gap is smaller than 2 mm.

9. The mobile communication device according to claim 1, wherein the main ground and the protruded ground are located on a first plane, the substrate comprises a first partial section and a second partial section forming an L shape, the first partial section of the substrate having the short-circuiting strip is located on a second plane perpendicular to the first plane, and the second partial section of the substrate having the antenna element is located on a third plane parallel to the first plane.

10. An antenna structure, comprising:

a grounding element, comprising a main ground and a protruded ground, wherein the protruded ground is electrically connected to an edge of the main ground; and an antenna element, disposed on a substrate, the antenna element comprising:

a feeding portion, comprising:

a feeding point, electrically connected to a signal source being disposed on the grounding element; and a first strip and a second strip, wherein the first strip and the second strip are both connected to the feeding point, open ends of the first strip and the second strip are extended toward opposite directions; and a radiating portion, comprising:

a shorting point, electrically connected to the protruded ground by a short-circuiting strip; and a first open end and a second open end;

wherein there is a first coupling gap between a first section of the radiating portion having the first open end and the first strip, and there is a second coupling gap between a second section of the radiating portion having the second open end and the second strip.

11. The antenna structure according to claim 10, wherein the short-circuiting strip comprises at least two bends, and a length of the short-circuiting strip is at least 1.5 times that of a distance between the shorting point and the protruded ground.

12. The antenna structure according to claim 10, wherein the antenna element comprises a first operating band and a second operating band, the first operating band covers from about 704 MHz to 960 MHz, and the second operating band covers from about 1710 MHz to 2690 MHz.

13. The antenna structure according to claim 12, wherein a length of the first strip from its open end to the feeding point is larger than 0.2 wavelength of the highest operating frequency of the second operating band.

14. The antenna structure according to claim 12, wherein a length of the second strip from its open end to the feeding point is larger than 0.2 wavelength of the highest operating frequency of the second operating band.

15. The antenna structure according to claim 10, wherein a length of the first strip is different from a length of the second strip.

16. The antenna structure according to claim 10, wherein the first coupling gap is smaller than 2 mm, and the second coupling gap is smaller than 2 mm.

17. The antenna structure according to claim 10, wherein the main ground and the protruded ground are located on a first plane, the substrate comprises a first partial section and a second partial section forming an L shape, the first partial section of the substrate having the short-circuiting strip is located on a second plane perpendicular to the first plane, and the second partial section of the substrate having the antenna element is located on a third plane parallel to the first plane.

* * * * *